INVENTOR.
ANDREW SHOH
BY:
Ervin B. Steinberg

INVENTOR.
ANDREW SHOH
BY:
Ervin B. Steinberg

3,441,875
ELECTRICAL SWITCHING CIRCUIT USING SERIES CONNECTED TRANSISTORS

Andrew Shoh, Ridgefield, Conn., assignor to Branson Instruments, Incorporated, Stamford, Conn., a corporation of Delaware Filed Aug. 15, 1967, Ser. No. 660,810
Int. Cl. H03b *5/02*
U.S. Cl. 331—117 6 Claims

ABSTRACT OF THE DISCLOSURE

To provide substantially equal electrical potential distribution across series connected switching transistors, an autotransformer is capacitively coupled to the transistors.

This invention concerns an electrical switching circuit and, more particularly, has reference to an electrical switching circuit for transistors. Quite specifically, this invention concerns an electrical switching circuit using series connected transistors and including means for providing substantially equal electrical potential distribution across the transistors of the series connection.

When operating an electrical circuit from a high voltage line, it is often necessary to connect switching transistors in series since the potential of the supply exceeds the potential which may be applied across a single transistor. In such cases, it is desirable that there exist a substantially equal voltage distribution across the individual transistors of the series connection. This problem is particularly acute when switching is accomplished at high frequency, typically when energizing an oscillator operating at an ultrasonic frequency from a source of direct current. The high switching rate resulting in steep voltage buildup makes some means for equal voltage sharing between the transistors not only desirable, but mandatory.

It is an object of this invention, therefore, to provide a circuit in which substantially equal potential distribution is obtained for a series connection of transistors.

Another important object of this invention is the provision of a switching circuit which incorporates means for assuring substantially equal voltage distribution across a set of series connected switching transistors.

Still another important object of this invention is the provision of a high frequency switching circuit using series connected transistors for energizing a high frequency oscillator from a source of direct current and the provision of means for obtaining substantially equal voltage distribution among the individual transistors of the series connection.

Further and still other objects of this invention will be more readily apparent from the following description when taken in conjunction with the accompanying drawings, in which.

Figure 1:
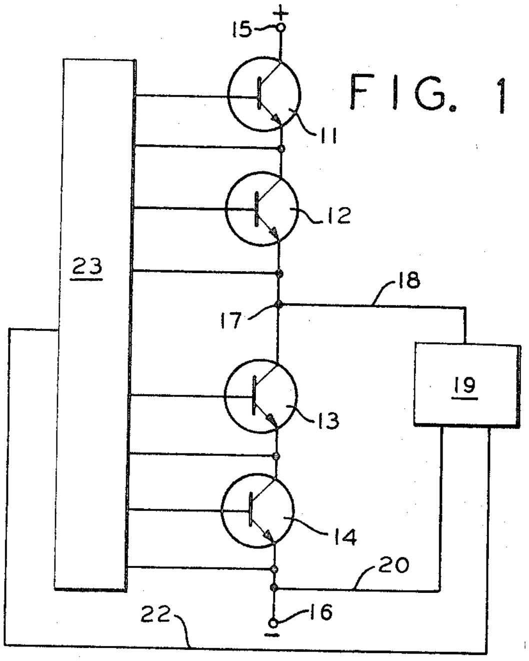
FIGURE 1 is a schematic circuit diagram of the problem posed.

Referring now to the figures and FIGURE 1 in particular, there is shown a first series connection of transistors 11 and 12, and a second series connection of transistors 13 and 14, both sets of transistors being connected serially between the positive and negative terminals 15 and 16 of a direct current source. A midpoint 17, disposed between the first and the second set of transistors, is connected via a conductor 18 to a load circuit 19 which, in turn, is connected via the conductor 20 to the negative terminal 16 of the current source.

While the load circuit 19 may comprise different types of electrical circuits, in the example described herein, it comprises typically an oscillatory circuit which energizes an ultrasonic energy transducer operating at a ferquency of 20 kHz. or higher. During the first half of the oscillatory cycle, current flows from the positive terminal 15 through the tarnsistors 11 and 12 to the connection point 17, via the conductor 18 to the load circuit 19, and via the conductor 20 to the negative terminal 16. During the succeeding half cycle, current flows from the load circuit 19 via the conductor 18, the connection point 17, through the transistors 13 and 14 to the negative terminal 16. A feedback circuit, derived from the oscillatory circuit 19, applies via the conductor 22 and the connections in the block 23 suitable gating potentials between the base and emitter electrodes of the respective transistors 11, 12, 13 and 14 to provide alternately current conduction through one of the sets of series connected transistors as described hereinabove.

It will be appreciated by those skilled in the art that in order to obtain reliable operation, voltage sharing between the series connected transistors is of importance, particularly when the voltage applied between the terminals 15 and 17 and between the terminals 17 and 16 is in excess of the voltage rating of a single transistor. The switching mode of operation of the circuit resulting in high rate of change of voltage (*de/dt*) adds to the problem of uneven voltage sharing and makes some means for equal voltage distribution a necessity.

Figure 2:
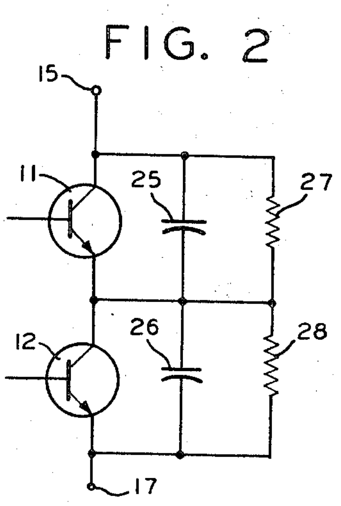
FIGURE 2 is a schematic circuit diagram of a first solution for providing substantially equal voltage distribution across the series connected transistors.

One method by which equalizing of the voltages may be achieved is shown in FIGURE 2 wherein an arrangement of resistance-capacitance voltage dividers is employed. A set of capacitors 25 and 26 is connected in parallel with the respective transistors 11 and 12, and resistors 27 and 28 are connected in parallel with the respective capacitors. It will be apparent that the same arrangement is repeated for the series connection of transistors 13 and 14 in FIGURE 1. In order that this circuit be effective, the capacitance of capacitors 25 and 26 needs to be rather high and such capacitance may interfere with the high speed operation of the switching circuit and the oscillatory circuit. Additionally, the use of resistors is undesirable inasmuch as the resistors dissipate power which must be supplied from the power source, but does not form a part of the useful load circuit.

Figure 3:
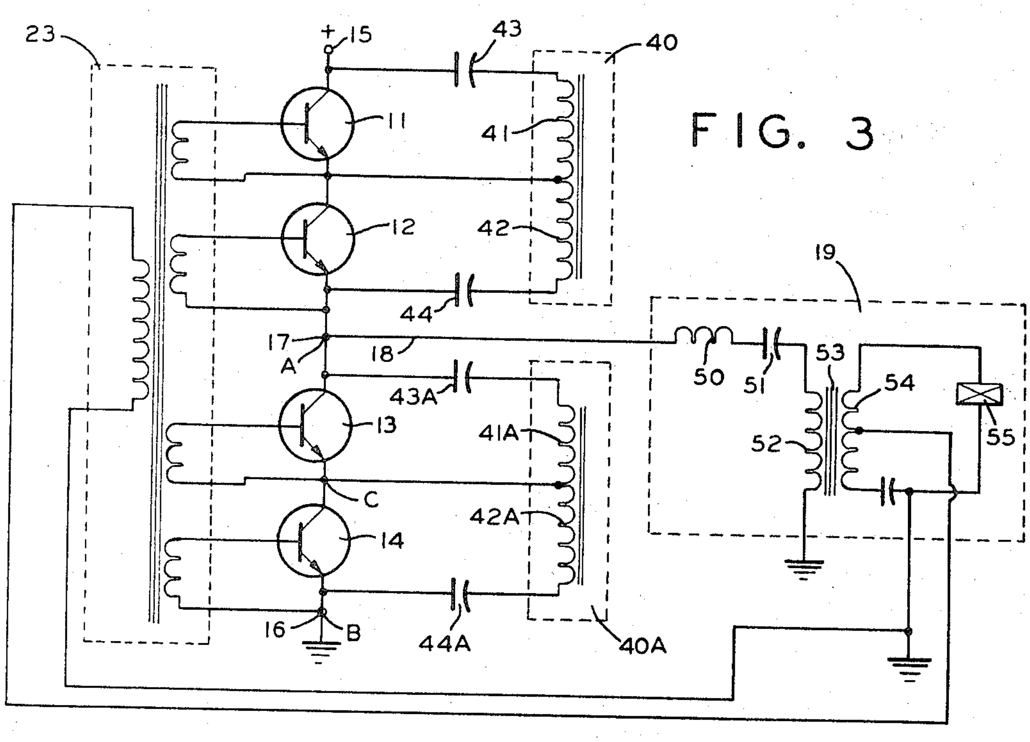
FIGURE 3 is a schematic electrical circuit diagram of the improved circuit arrangement.

FIGURE 3 shows the improved arrangement according to the present invention. A small autotransformer 40, having a centertapped winding to provide two windings 41 and 42 of equal turns, is capacitively coupled by means of capacitors 43 and 44 across the series connection of transistors 11 and 12. Each transformer winding is coupled in series with one capacitor across the emitter and collector electrodes of a respective transistor. The capacitors block the conduction of direct current through the winding, but present substantially no impedance to the flow of alternating current. The same arrangement is repeated for the series connection of transistors 13 and 14, namely autotransformer 40A having windings 41A and 42A, and capacitors 43A and 44A. It will be apparent that if additional series connected transistors are present, the same arrangement is duplicated.

It has been found that in order to obtain good results it is necessary that the transformer provide very tight coupling between the two halves of the winding. Most suitably, the windings 41 and 42, as well as windings 41A and 42A comprise bifilarly wound windings. In a typical example, the capacitors 43, 44, 43A and 44A were rated 1 mfd., windings 41, 42, 41A and 42A comprised 160 turns each on E1102–142 core, RO3 or WO4 ferrite material, available from Allen-Bradley Company, Milwaukee, Wis. Frequency of operation was 20 kHz., direct current voltage was 160 v., and transistors were type RCA 2N4348.

FIGURE 3 shows, further, schematically the oscillatory circuit 19, comprising as its main parts a series inductance 50, a capacitor 51 and the primary winding 52 of a transformer 53. The primary winding of the transformer 53 is coupled to a secondary winding 54 which energizes a piezoelectric transducer 55 for providing ultrasonic energy in response to the electrical oscillations applied thereacross. The secondary winding 54 is tapped to provide a feedback potential which, via the transformer and its windings contained in the block 23, applies the gating potentials to the respective sets of series connected transisors.

Figure 4:
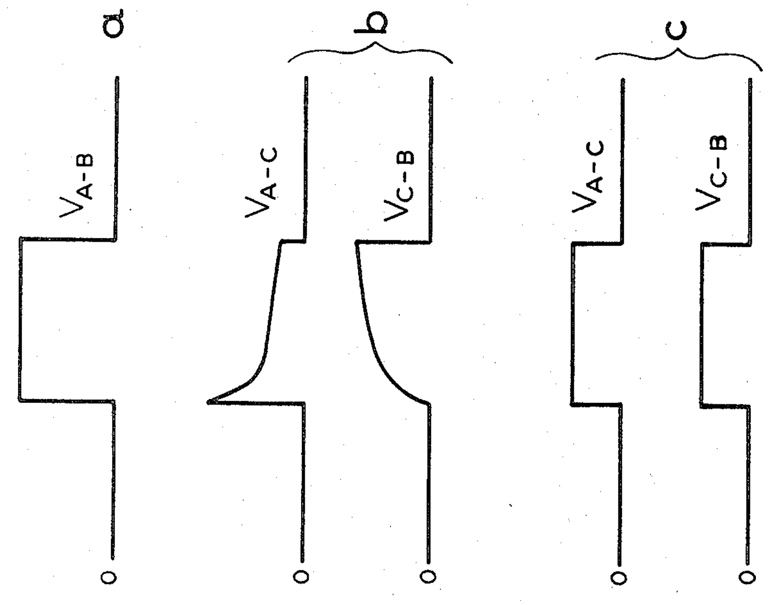
FIGURE 4 is an illustration showing typical wave shapes.

FIGURE 4 depicts typical voltage wave shapes prevailing with the various arrangements described heretofore.

FIGURE 4*a* shows the total voltage periodically existing across the transistors 13 and 14 as measured between the points A and B which correspond to the junction points 17 and 16, FIGURE 3. In the absence of any potential equalizing arrangement, the voltage division between the transistors 13 and 14 will depend on the individual transistor characteristics, such as switching speed, leakage and interelectrode capacitance, and the potential distribution for transistors of the same type when selected at random will usually not be equal.

FIGURE 4*b* shows a set of possible voltage distribution curves across the transistors 13 and 14 respectively when no potential equalizing means is provided. Typically, one of the transistors is exposed to more than one-half of the total voltage existing across the combination.

FIGURE 4*c* shows the condition obtained with the equalizing means depicted in FIGURE 3, showing that each transistor is exposed to its proportionate share of the total voltage existing across the combination. The voltages across the two transistors are equal because the voltages across the two halves of the center-tapped transformer are equal.

Figure 5:
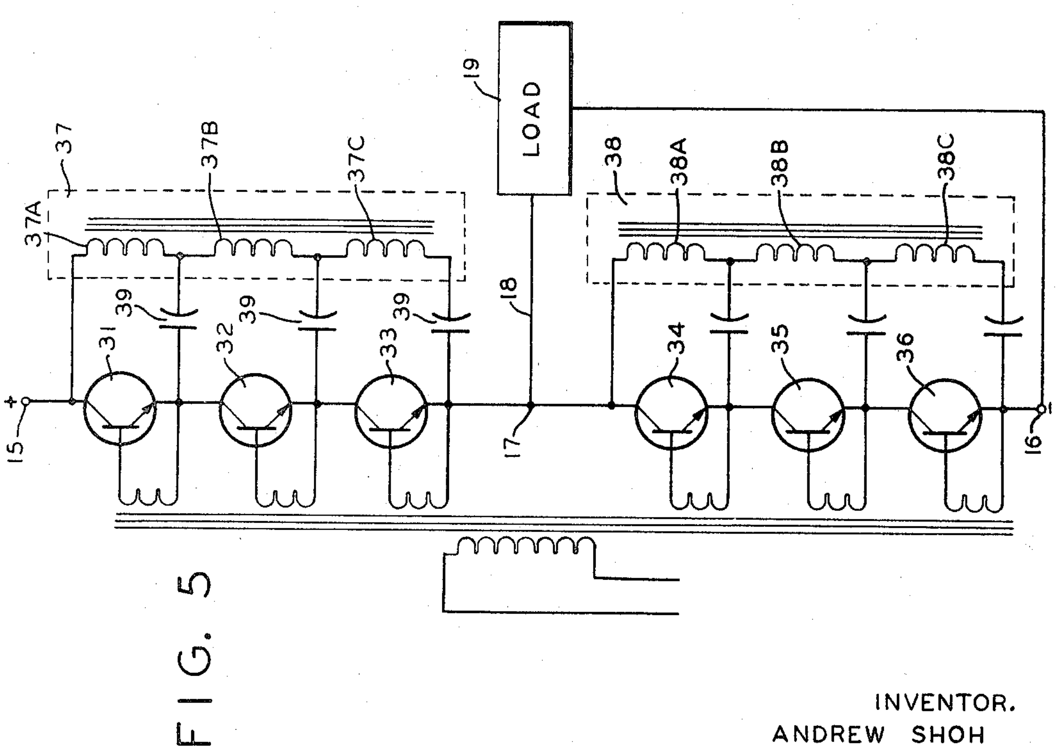
FIGURE 5 is a schematic electrical circuit diagram showing the principle of this invention when three switching transistors are connected in series.

FIGURE 5 shows the principle of the present invention expanded to three series connected switching transistors. As shown, two sets of three series connected transistors are used, numerals 31, 32, 33 and 34, 35, 36. The first set of transistors 31, 32 and 33 is associated with an autotransformer 37, and the second set of transistors with an autotransformer 38. The first transformer 37 has three, preferably trifilarly wound, windings 37A, 37B and 37C, each such winding being coupled in series with a respective capacitor 39 across the emitter and collector electrodes of a transistor. Similarly, the transformer 38 has three windings 38A, 38B, 38C, each such winding being coupled in series with a capacitor to one of the transistors. The three windings of a respective transformer have an identical number of turns to provide for the potential equalization. It will be apparent that for the condition of four or more series connected transistors, the circuit is expanded further in accordance with the principle disclosed.

While there has been described and illustrated a certain preferred embodiment of the invention, it will be apparent to those skilled in the art that various changes and modifications may be made therein without deviating from the basic principle and intent of this invention.

What is claimed is:

1. An electrical switching circuit using at least a pair of series connected transistors for switching the flow of electrical current between a source and a load circuit and means causing said pair of transistors to be conductive simultaneously, the improvement comprising: electromagnetic means capacitively coupled across the collector and emitter electrodes of each transistor for providing substantially equal electrical potential distribution across said transistors.

2. An electrical switching circuit as set forth in claim 1 wherein said electromagnetic means is a transformer having a first and a second winding of substantially equal number of turns, said first winding being capacitively coupled between the emitter electrode and the collector electrode of the first transistor, and said second winding being capacitively coupled between the emitter electrode and the collector electrode of said second transistor.

3. An electrical switching circuit as set forth in claim 2 wherein said transformer is an autotransformer having a pair of bifilarly wound windings.

4. An electrical switching circuit as set forth in claim 3 wherein said pair of transistors is connected between a source of direct current and an oscillatory load circuit, and said circuit includes feedback means coupled between said load circuit and said pair of transistors for cyclically providing current flow in said load circuit.

5. An electrical circuit comprising:

a supply of direct current having a positive and a negative terminal;

a first and a second plurality of series connected switching transistors connected serially between said positive terminal and said negative terminal;

an oscillatory circuit coupled to a point between said first and said second plurality of switching transistors and one of said terminals;

feedback means coupled between said oscillatory circuit and said transistors for cyclically providing current conduction alternately through said first and second plurality of transistors whereby to energize said oscillatory circuit, and means connected to each of said plurality of transistors for providing substantially the same electrical potential across each transistor of a respective plurality, said means including an autotransformer having bifilarly wound windings, each such winding being coupled in series with a capacitor across the emitter electrode and collector electrode of a respective transistor.

6. An electrical circuit as set forth in claim 5 wherein said oscillatory circuit operates in the ultrasonic frequency range.

References Cited

UNITED STATES PATENTS 3,317,856 5/1967 Wilkinson ---------- 331—113

FOREIGN PATENTS 1,238,817 7/1960 France.

JOHN KOMINSKI, *Primary Examiner.*

U.S. Cl. X.R.

307—252, 254; 310—8.1; 330—18; 331—113.1